United States Patent
Koyano et al.

(12) 
(10) Patent No.: US 6,490,933 B2
(45) Date of Patent: Dec. 10, 2002

(54) ULTRASONIC FLOW METER WITH REDUCED NOISE

(75) Inventors: Kiyoshi Koyano, Kanagawa-ken (JP); Yoshiko Usui, Kanagawa-ken (JP); Haitao Pan, Kanagawa-ken (JP)

(73) Assignee: Izumi Engineering Laboratory Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/736,259

(22) Filed: Dec. 15, 2000

(65) Prior Publication Data

US 2002/0100335 A1 Aug. 1, 2002

(51) Int. Cl.⁷ .............................. G01F 1/66
(52) U.S. Cl. ..................... 73/861.27; 73/861.29
(58) Field of Search .............. 73/861.23, 861.25, 73/861.26, 861.27, 861.28, 861.29

(56) References Cited

U.S. PATENT DOCUMENTS

| | | | | |
|---|---|---|---|---|
| 4,445,389 A | * | 5/1984 | Potzick et al. | 73/861.27 |
| 4,454,767 A | * | 6/1984 | Shinkai et al. | 73/861.18 |
| 5,131,279 A | * | 7/1992 | Lang et al. | 73/861.18 |
| 5,179,862 A | * | 1/1993 | Lynnworth | 73/861.28 |
| 5,269,191 A | * | 12/1993 | Wada | 73/861.11 |
| 5,868,437 A | * | 2/1999 | Teague | 138/149 |
| 6,122,956 A | * | 9/2000 | Klausner et al. | 73/61.71 |

FOREIGN PATENT DOCUMENTS

JP    10-122923    5/1998

* cited by examiner

*Primary Examiner*—Harshad Patel
(74) *Attorney, Agent, or Firm*—McDermott, Will & Emery

(57) ABSTRACT

The flow rate of a fluid can be measured using an ultrasonic flow meter according to the present invention with a higher measuring accuracy and a lower cost. The feature of the invention consists in an ultrasonic flow meter comprising a measurement tube for flowing a fluid to be subjected to measurement, a first oscillator fitted to the outer circumference of the measurement tube, a second oscillator fitted to the outer circumference of the measurement tube at a predetermined interval along the flow of the fluid from the first oscillator and an acoustic filter fitted to the measurement tube for cutting high frequency range of the oscillating wave propagating through the oscillating tube, in which the flow rate of a fluid is measured based on a time difference between a time required when the ultrasonic wave from the upstream oscillator reaches the downstream oscillator and another time required when the ultrasonic wave from the downstream oscillator reaches the upstream oscillator.

2 Claims, 6 Drawing Sheets

FIG. 2
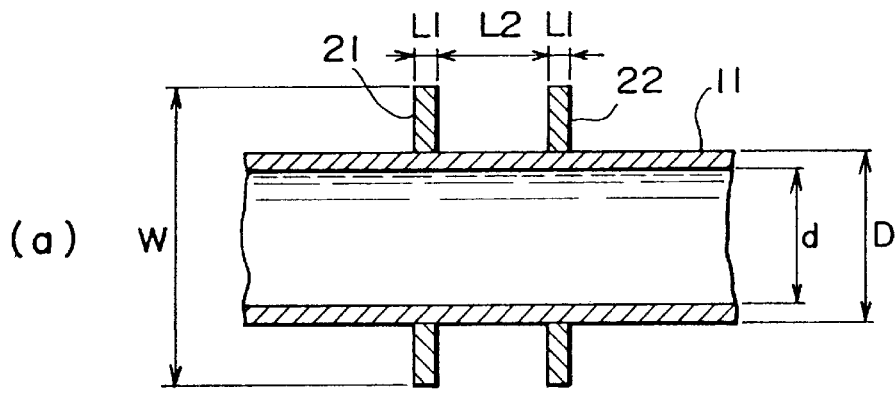
(a)
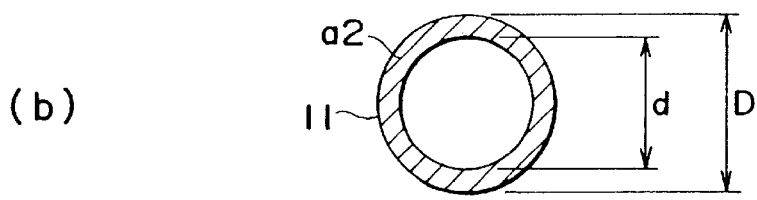
(b)
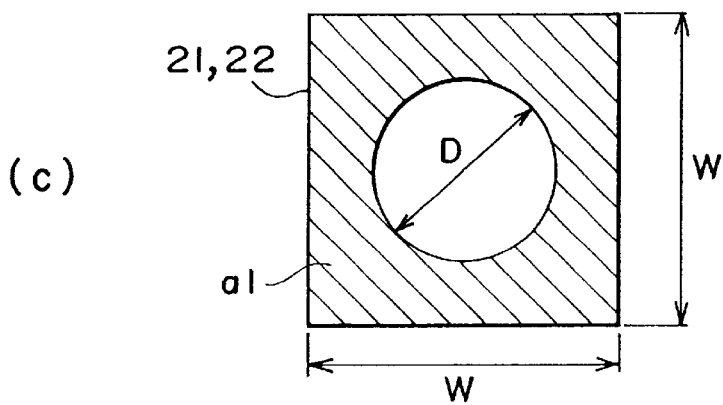
(c)

ULTRASONIC FLOW METER WITH REDUCED NOISE

BACKGROUND OF THE INVENTION

1. Field of the Invention

This invention relates to an ultrasonic flow meter suitable for use in tube or pipe line.

2. Description of the Prior Art

As prior art techniques for measuring a flow rate of a fluid such as gases or liquids flowing in a tube or pipe line, various apparatus such as orifices and nozzles are known and of late, ultrasonic flow meters utilizing ultrasonic wave have widely been spread.

FIG. 7 shows a figure for illustrating the principle of an ultrasonic flow meters, in which when a first oscillator 102 and second oscillator 103 are fitted to a measurement pipe 101 through a constant distance L, and an ultrasonic wave is transmitted from one of the first oscillator 102 and second oscillator 103 and received by the other of the second oscillator 103 and first oscillator 102, there occurs a difference between a time t1 required when the ultrasonic wave from the first oscillator 102 reaches the second oscillator 103 and another time t2 required when the ultrasonic wave from the second oscillator 103 reaches the second oscillator 102.

When the sonic velocity in a fluid is c and a velocity of the fluid is v, the following calculation formula is concluded:

$t1 = L/(c+v)$     ①

$t2 = L/(c-v)$     ②

$1/t1 - 1/t2 = 2v/L$     ③

$v = L/2(1/t1 - 1/t2)$     ④

That is, a formula ③ is derived by subtracting the reciproprcal number of a formula ② from the reciproprcal number of a formula ① and this formula ③ is rearranged based on v to obtain a formula ④. According to this formula ④, the flow velocity v of the fluid can be given if the distance L, time t1 and t2 are determined. When the thus obtained flow velocity v is multiplied by the inner cross-sectional area of the measurement pipe 101, the flow rate can be obtained.

As an invention based on the above described principle, for example, there is an "ultrasonic flow meter" disclosed in JP-A-10-122923, which is constructed of such a simple structure that a measurement tube 1 is provided with ring-shaped ultrasonic oscillators 2A and 2B, and a gap with the tube 1 is filled with grease 3, 3 to acoustically combine the measurement tube 1 with the ultrasonic oscillators 2A and 2B, as shown in FIG. 3 of the same publication. These marks are same as described on this publication. The inner part of the measurement tube 1 so smooth that cleaning of contamination is not required and the apertures of the ultrasonic oscillators 2A and 2B can be rendered smaller to comply with the aperture of the measurement tube 1, thus reducing the aperture of the measurement tube 1.

FIG. 8 shows a figure for illustrating the problems of an ultrasonic flow meters of the prior art, in which when ultrasonic oscillators 2A and 2B are fitted to the measurement pipe 1, the ultrasonic oscillator 2A being used as a sending side and the ultrasonic oscillator 2B being used as a receiving side, an oscillating wave fundamentally propagates along an arrow ① in a fluid (medium) flowing in the measurement tube 1. During the same time, the measurement tube 1 itself functions as a propagation material and an oscillating wave shown by an arrow ② propagates to the ultrasonic oscillators 2B.

Thus, the oscillating wave of the arrow ② sometimes becomes a noise to affect unfavourably the flow measurement. When the propagation speed of the arrow ② is close to that of the arrow ①, in particular, influences thereof are larger.

SUMMARY OF THE INVENTION

It is an object of the present invention to provide an ultrasonic flow meter capable of moderating influences of the oscillating wave propagating through the measurement tube itself, whereby the above described problems of the prior art can be solved.

The above described object can be attained by an ultrasonic flow meter comprising a measurement tube for flowing a fluid to be subjected to measurement, said tube being constructed of a metallic or metal-like material capable of propagating ultrasonic wave and being free from obstacles hindering the flow of the fluid in the tube, a first oscillator fitted to the outer circumference of the measurement tube, a second oscillator fitted to the outer circumference of the measurement tube at a predetermined interval along the flow of the fluid from the first oscillator and an acoustic filter fitted to the measurement tube for cutting off high frequency range of the oscillating wave propagating through the oscillating tube, in which the flow rate of a fluid is measured based on a time difference between a time required when the ultrasonic wave from the upstream oscillator reaches the downstream oscillator and another time required when the ultrasonic wave from the downstream oscillator reaches the upstream oscillator.

BRIEF DESCRIPTION OF THE DRAWING

FIG. 2 is a cross-sectional view for an acoustic model of an acoustic filter according to the present invention.

DETAILED DESCRIPTION OF THE INVENTION

Figure 1:
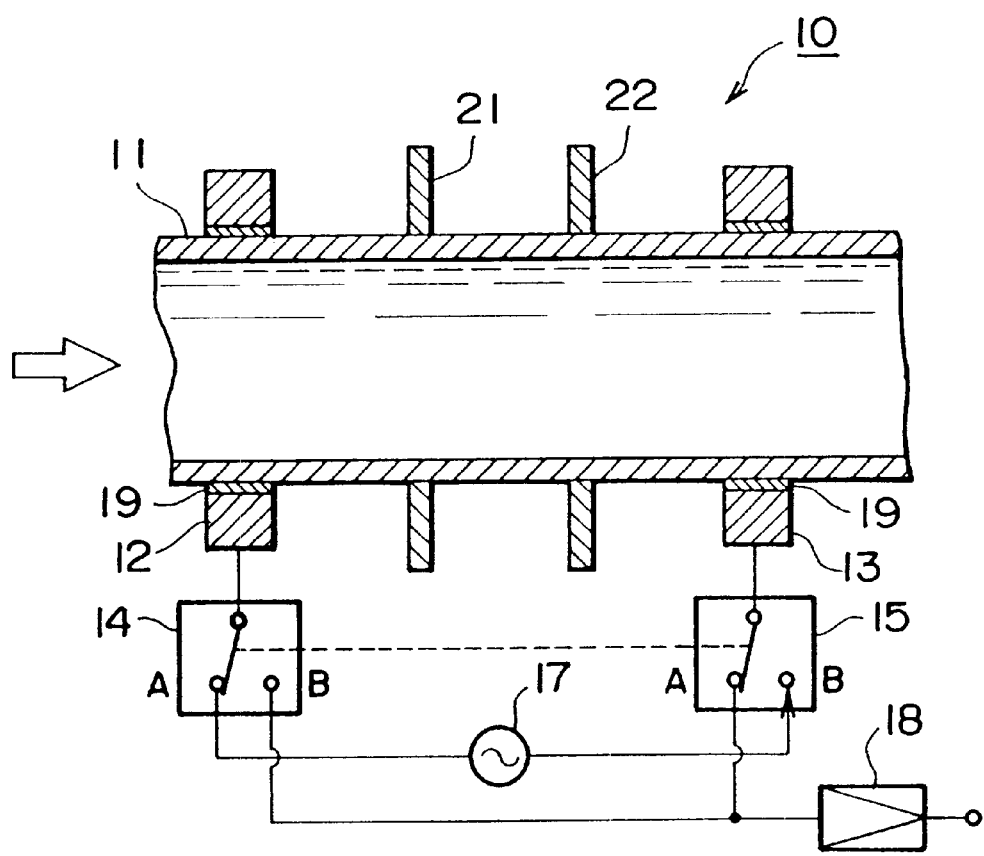
FIG. 1 is a cross-sectional view of an ultrasonic flow meter for illustrating the principle (First Example) according to the present invention.

The inventors have tried to add a function for attenuating an oscillating wave to the measurement tube in order to moderate the influences of the oscillating wave propagating through the measurement tube itself and accordingly, have succeeded in developing the following first method and second method. The first method comprises, when the measurement tube is constructed of a metallic material or the like capable of well propagating an oscillating wave, fitting an acoustic filter to the measurement tube and thereby cutting off or reducing the oscillating wave. The second method comprises constructing the measurement tube itself of a material capable of attenuating an oscillating wave.

Specifically, the first invention provides an ultrasonic flow meter comprising a measurement tube for flowing a fluid to be subjected to measurement, said tube being constructed of a metallic or metal-like material capable of propagating ultrasonic wave and being free from obstacles hindering the flow of the fluid in the tube, a first oscillator fitted to the outer circumference of the measurement tube, a second oscillator fitted to the outer circumference of the measurement tube at a predetermined interval along the flow of the fluid from the first oscillator and an acoustic filter fitted to the measurement tube for cutting off high frequency range of the oscillating wave propagating through the oscillating tube, the oscillator being preferably of a material for piezoelectricity.

Fundamentally, the flow rate of a fluid is measured based on a time difference between a time required when the ultrasonic wave from the upstream oscillator reaches the downstream oscillator and another time required when the ultrasonic wave from the downstream oscillator reaches the upstream oscillator. During the same time, the oscillating wave propagating through the measurement tube is effectively cut off by the acoustic filter, so that influences of this oscillating wave upon measurement of the flow rate of the fluid may be rendered very small. Therefore, precision of the measurement of the flow rate can largely be increased according to the first invention.

In the second invention, the acoustic filter is a flange of preferably W, Cu or stainless steel. Since the acoustic filter is composed of a simple flange, increase of the cost for the ultrasonic flow meter can be suppressed.

The third invention provides an ultrasonic flow meter comprising a measurement tube for flowing a fluid to be subjected to measurement, said tube being constructed of a resin being free from obstacles hindering the flow of the fluid in the tube, a first oscillator fitted to the outer circumference of the measurement tube, a second oscillator fitted to the outer circumference of the measurement tube at a predetermined interval along the flow of the fluid from the first oscillator. Fundamentally, the flow rate of a fluid is measured based on a time difference between a time required when the ultrasonic wave from the upstream oscillator reaches the downstream oscillator and another time required when the ultrasonic wave from the downstream oscillator reaches the upstream oscillator in the similar manner to the first invention. Since the oscillating wave propagating through the measurement tube is attenuated by the measurement tube itself during the same time, this oscillating wave hardly affects measurement of the fluid.

According to the third invention, therefore, the measuring accuracy of the flow rate can largely be increased.

Embodiments of the present invention will now be illustrated based on the accompanying drawings.

FIG. 1 is a cross-sectional view of an ultrasonic flow meter (First Example) to illustrate the principle of the present invention, in which an ultrasonic flow meter 10 comprises a measurement tube 11, a first oscillator 12 and second oscillator 13, being arranged at a constant distance L on the the measurement tube 11, a first oscillator 12 and a second oscillator 13, being arranged at a constant distance L on the measurement tube 11, a power source 17 and an amplifier 18, being connected to the first oscillator 12 through a first switch 14 and to the second oscillator 13 through a second switch 15, and flanges 21 and 22, as an acoustic filter, fitted to the measurement tube 11. In FIG. 1, a white arrow shows a flowing direction and so on.

The first oscillator 12 and the second oscillator 13 are closely fitted to the measurement tube 11 through acoustic binders 19, 19. The acoustic binder 19 is combined to such an extent that the oscillators 12, 13 are prevented from shifting to the axial direction of the measurement tube 11, for example, through receiving an oscillation, etc., and consists of a material capable of well transmitting oscillations, preferably, epoxy resins or greases.

The first switch 14 and the second switch 15 are changed into an A side as shown in FIG. 1 to convert the first oscillator 12 into a generator and to convert the second oscillator 13 into a receiver and thus, the propagation time of the normal flow can be measured, while the first switch 14 and the second switch 15 are then changed into a B side reversely to FIG. 1 and the propagation time of the reverse flow can be measured using the first oscillator 12 as a receiver and the second oscillator 13 as a generator.

During the same time, the flanges 21 and 22 as acoustic filters exhibit a function to cut off an oscillating wave propagating through the measurement tube 11 itself, in particular, a high frequency range wave. The principle of this function will be illustrated below.

FIGS. 2(a) to (c) show acoustic models of an acoustic filter according to the present invention. (a) is a rough figure of FIG. 1, in which the thickness of the flanges 21 and 22, as the acoustic filter, is defined as L1, the inner distance of the acoustic filters 21 and 22 is defined as L2 and the inner diameter and outer diameter of the measurement tube 11 are respectively defined as d and D.

(b) is a cross-sectional view of the measurement tube 11 having the inner diameter of d and the outer diameter of D and accordingly, an effective cross-sectional are a2 in the measurement tube 11 is $(\pi/4) \times D^2 - (\pi/4) \times d^2$.

(c) is a cross-sectional view of square flanges 21 and 22 of W×W, having a hole made with a diameter of D and accordingly, an effective cross-sectional area a1 is $W^2 - \{(\pi/4) \times D^2\}$. Considering the above described model as a propagating path, this will be a low frequency passing type filter, i.e. high frequency cutting off filter, during which a cuttoff frequency ω2 is as follows:

$$\omega 2 = \sqrt{(2s/m)} \qquad 5$$

s:stiffness $$s = \frac{(a1 + a2)^2 \cdot \rho \cdot c^2}{(a1 + a2) \cdot L1} \qquad 6$$

ρ:density of medium m:mass $$m = \left(\frac{a1 + a2}{a2}\right)^2 \cdot a2 \cdot L2 \cdot \rho \qquad 7$$

$$\omega 2 = \sqrt{2 \cdot \frac{c^2}{L1 \cdot L2} \cdot \left(\frac{a2}{a1 + a2}\right)} \qquad 8$$

$$f2 = \omega 2 / 2\pi \qquad 9$$

That is, ω2 is represented by a formula ⑤ consisting of a function of the stiffness s and mass m, while the stiffness s is represented by a formula ⑥ and the mass m is represented by a formula ⑦. Thus, when these formulas are inserted in the formula ⑤ and rearranged, a formula ⑧ is obtained and a frequency f2 can be given by a formula ⑨. Consequently, f2 can be concluded from c, L1, L2, a1 and a2.

Figure 3:
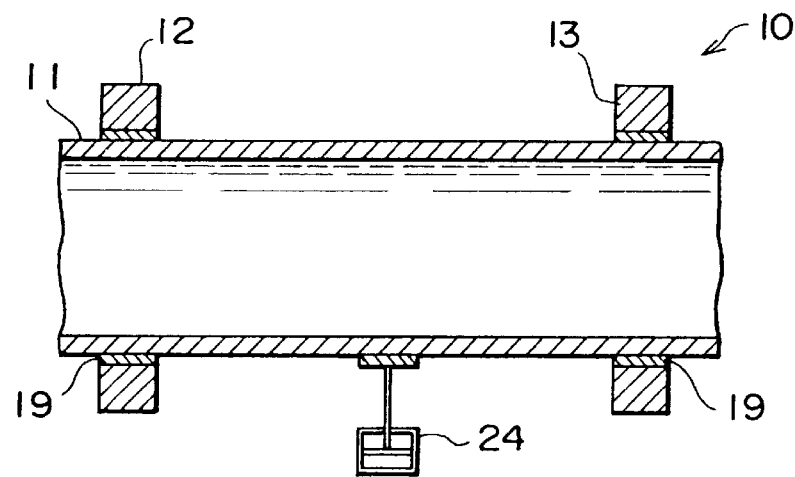
FIG. 3 is a cross-sectional view of an ultrasonic flow meter for illustrating the principle (Second Example) according to the present invention.

FIG. 3 is a cross-sectional view of an ultrasonic flow meter (Second Example) to illustrate the principle of the present invention, in which a damper 24, as an acoustic filter, is provided to the measurement tube 11, so that, for example, an oscillating wave propagating through the measurement tube 11 itself of an ultrasonic wave generated in the first oscillator 12 is absorbed by the damper 24 and a considerable part of the oscillating wave can thus be cut off. Accordingly, the acoustic filter of the present invention can be any of the flanges 21 and 22 in FIG. 1, the damper 24 in FIG. 3 and the like capable of exhibiting equal functions, without limiting the structures thereof.

Figure 4:
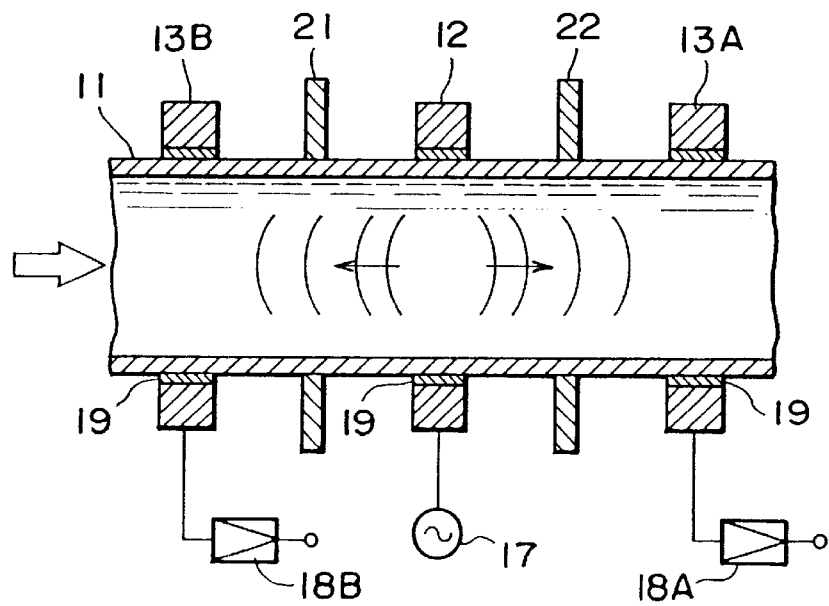
FIG. 4 is a cross-sectional view of an ultrasonic flow meter for illustrating the principle (Third Example) according to the present invention.

FIG. 4 is a cross-sectional view of an ultrasonic flow meter (Third Example) to illustrate the principle of the present invention, in which the first oscillator 12 is fitted to the center of the measuring tube 11, the second oscillatiors 13A and 13B are respectively fitted to the downstream side and upstream side from the first oscillator 12, the power source 17 is connected with the above described first oscillator 12, the amplifiers 18A and 18B are respectively fitted to the second oscillators 13A and 13B, and the flanges 21 and 22, as the acoustic filter, are fitted to the measurement tube 11 between the first oscillator 12 and the second oscillators 13A and 13B. Since, for the ultrasonic wave generated from the first oscillator 12, the time required for reaching the second oscillator 13A of the downstream side is shorter and the time required for reaching the second oscillator 13B of the upstream side is longer, the flow rate of the fluid can be determined by the time difference thereof. Total of the three members of the oscillators 12, 13A and 13B are required, but no switch is required. Furthermore, the flanges 21 and 22, as the acoustic filters, attenuate the oscillating wave propagating through the measurement tube 11 itself, so the measurement accuracy is consequently increased.

When the measurement tube 11 is a stainless tube, carbon steel tube or glass tube, each having a higher ultrasonic wave propagating property, the above described acoustic filter is required. When the measurement tube 11 is a resin tube such as tetrafluoroethylene having a much larger attenuation property of the oscillating wave, as compared with metals, however, attenuation of the oscillating wave is rendered possible by the resin itself. Consequently, in this case, provision of attachments such as flanges is not necessary, resulting in simplification of the structure of the ultrasonic flow meter as well as improvement of the appearance.

EXAMPLES

The present invention will now be illustrated by the following experimental examples without limiting the same.

The experimental model is fundamentally as shown in FIG. 2 with the following dimensions:

d=2.8 cm
D=3.2 cm
L1=1.5 cm
L2=1.5 cm
W=7 cm

From these numerals, it is apparent that the cross-sectional area a1 is 41 cm$^2$ and the cross-sectional area a2 is 1.9 cm$^2$.

The material of the measurement tube is stainless steel and the propagation speed (sonic speed) c is about $5.3 \times 10^5$ (cm/s). The fluid (medium) to be subjected to measurement is water and the propagation speed c of water at 1 atm and 0° C. is about $1.4 \times 10^5$ (cm/s), a1=41 (cm$^2$), a2=1.9 (cm$^2$), L1=1.5 (cm), L2=1.5 (cm) and c=5.3×10$^5$ (cm/s) are substituted in the foregoing formula ⑧ and based on the resulting value, a frequency f2 is calculated by the foregoing formula ⑨ to obtain a value of about 17 kHz. It can be expected that a higher frequency ultrasonic wave than this frequency is cut off.

Figure 5:
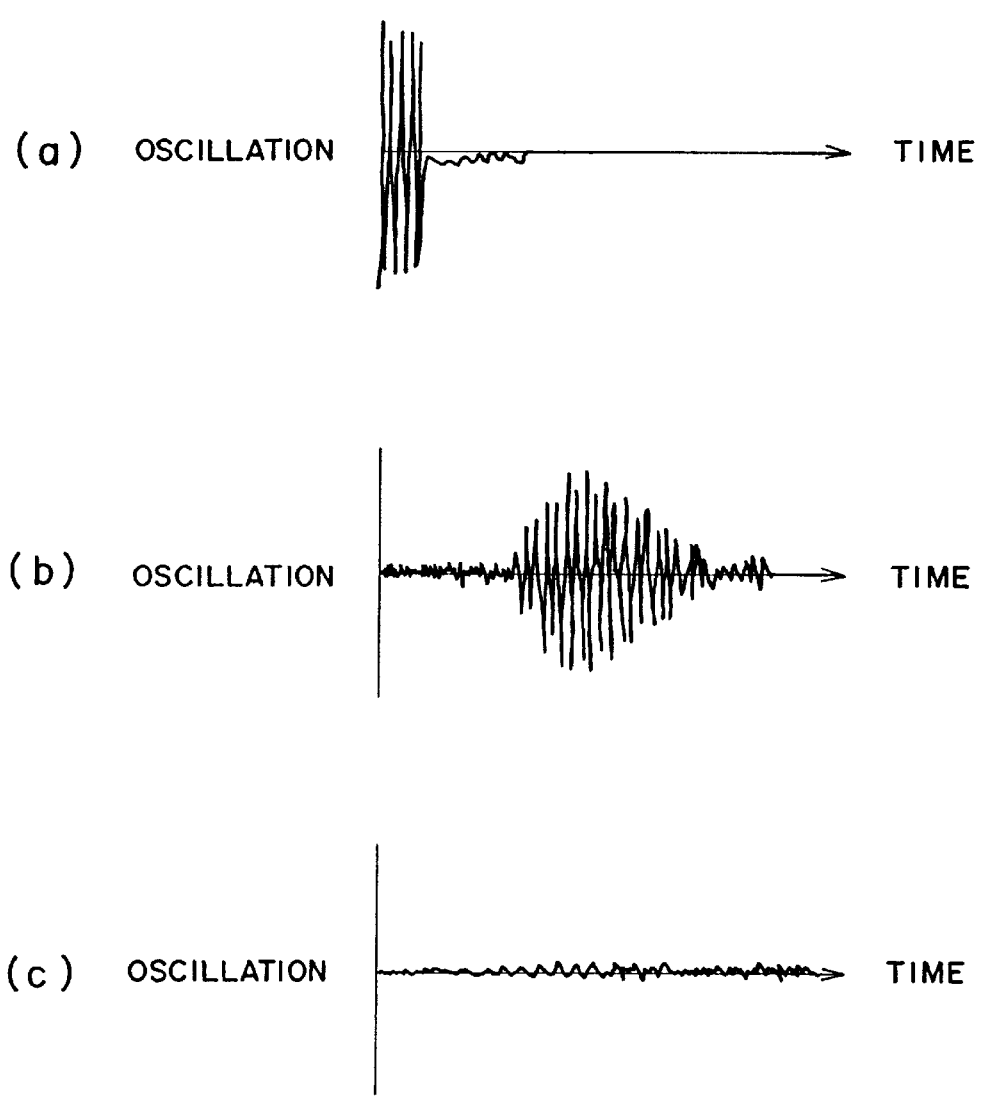
FIG. 5 are graphs in Comparative Experiments, showing the effects of acoustic filters.

FIGS. 5(a) to (c) are graphs in Comparative Experiments, showing the effects of acoustic filters, in which (b) shows a receiving wave form when the first oscillator of an acoustic filter-free measurement tube is subjected to oscillation under such a dry state that a measurement objective (medium) is not flowed and (c) shows a receiving wave form when the first oscillator of an acoustic filter-fitted measurement tube is subjected to oscillation. (a) is a figure of a transmission wave form, as a prerequisite thereof, in which the propagating frequency is adjusted to about 10 times, i.e. 170 kHz considering that the foregoing frequency f2 is about 17 kHz. It can be understood from (b) that the amplitude is very large, while, on the other hand, it is apparent from (c) that the amplitude is very small. (c) teaches that the amplitude can largely be reduced by providing the measurement tube with an acoustic filter.

Figure 6:
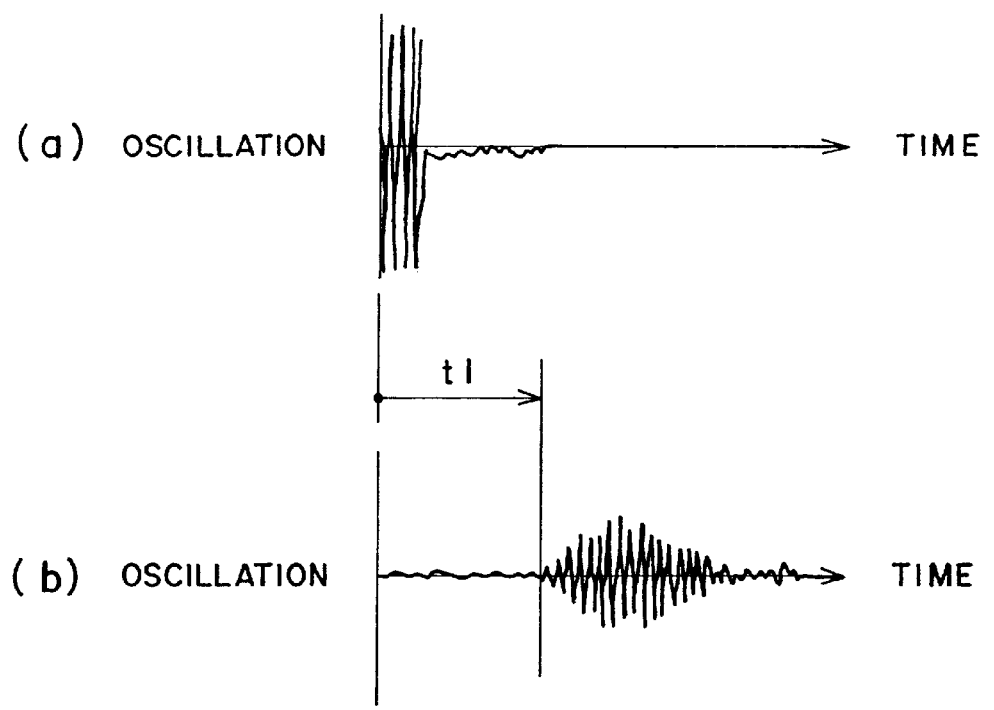
FIG. 6 are graphs showing time differences measured by the ultrasonic flow meter according to the present invention.
Figure 7:
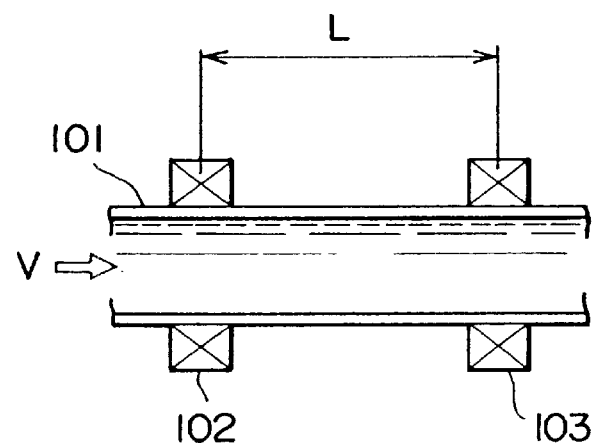
FIG. 7 is a drawing for illustrating the principle of an ultrasonic flow meter.
Figure 8:
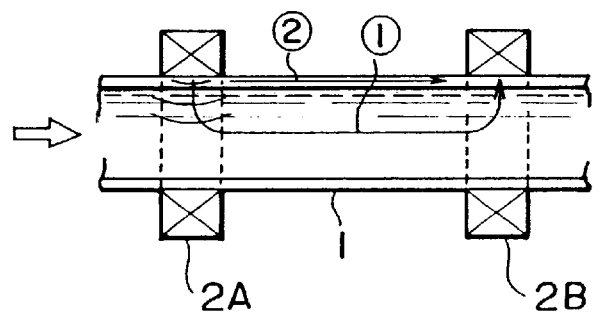
FIG. 8 is a drawing for illustrating the problem of an ultrasonic flow meter according to the prior art.

FIGS. 6(a) and (b) are graphs showing a time difference measured by the ultrasonic flow meter according to the present invention. (a) is the same figure of a transmission wave form as that of FIG. 5 with a carrier frequency of 170 kHz, while (b) is a figure of a receiving wave form when water is caused to pass through the acoustic filter-fitted measurement tube and the first oscillator is subjected to oscillation, and t1 is a measurement time obtained. In the figure of (b), the resulting wave form is almost considered due to ultrasonive wave propagating through the water, since (b) corresponds to passage of water through the measurement tube having given the results of the foregoing FIG. 5(c). Accordingly, reliability of the measurement time t1 is very high.

If water is passed through the measurement tube of the foregoing FIG. 5(b) and the acoustic filter-free measurement tube, on the other hand, a receiving wave will surely be given through a superimposed wave of FIG. 5(b) with that of FIG. 6(b) or through a synthesized wave thereof. If so, the receiving wave is a synthesized wave of a wave propagating through the measurement tube itself and a wave propagating through the water and therefore, the receiving wave cannot be said to precisely measure the speed of water. As apparent from this illustration, the acoustic filter of the present invention is capable of exhibiting marked advantages.

Advantages of Present Invention

The present invention can exhibit the following advantages according to the above described construction.

In the first invention, the first oscillator and the second oscillator are arranged outside the measurement tube and no obstacle is placed in the measurement tube. If there is an obstacle in the measurement tube, foreign matters tend to be accumulated on the obstacle and cleaning thereof is troublesome. The first invention is excellent in this respect, since there is no obstacle in the measurement tube, foreign matters are hardly accumulated in the measurement tube and even if cleaning is carried out, its operation for cleaning can simply be finished. In addition, the acoustic filter is fitted to the measurement tube to reduce an oscillating wave propagating through the measurement tube and consequently, the oscillating wave according to the fluid as the measurement objective can predominantly be received, thus resulting in increase of the measurement precision.

The second invention is characterized in that the acoustic filter is a flange. Since the acoustic filter is composed of a simple flange, increase of the cost of the ultrasonic flow meter can be suppressed.

In the third invention, the first oscillator and the second oscillator are arranged outside the measurement tube and no obstacle is placed in the measurement tube. If there is an obstacle in the measurement tube, foreign matters tend to be accumulated on the obstacle and cleaning thereof is troublesome. The third invention is excellent in this respect, since there is no obstacle in the measurement tube, foreign matters are hardly accumulated in the measurement tube and even if cleaning is carried out, its operation for cleaning can simply be finished. In the third invention, it is not required to provide the measurement tube with the acoustic filter, but this can be dispensed with only examination of the material. Accordingly, the ultrasonic flow meter can be prevented from being complicated. Furthermore, the oscillating wave propagating through the measurement tube can be attenuated and the oscillating wave according to the fluid as the measurement objective can predominantly be received, thus resulting in increase of the measurement precision.

What is claimed is:

1. An ultrasonic flow meter comprising a measurement tube for flowing a fluid to be subjected to measurement, said tube being constructed of a metallic material capable of propagating ultrasonic wave and being free from obstacles hindering the flow of the fluid in the tube, a first oscillator fitted to the outer circumference of the measurement tube, a second oscillator fitted to the outer circumference of the measurement tube at a predetermined interval along the flow of the fluid from the first oscillator and a plurality of acoustic filters fitted to the measurement tube between the first and second oscillators for cutting high frequency range of the oscillating wave propagating through the oscillating tube, in which the flow rate of a fluid is measured based on a time difference between a time required when the ultrasonic wave from the upstream oscillator reaches the downstream oscillator and another time required when the ultrasonic wave from the downstream oscillator reaches the upstream oscillator, wherein the acoustic filters are separated by an inner distance and comprise flanges having a thickness and the product of the inner distance of the acoustic filters and the thickness of the flanges is inversely proportional to said high frequency range of the oscillating wave.

2. An ultrasonic flow meter comprising a measurement tube for flowing a fluid to be subjected to measurement, said tube being constructed of a resin and being free from obstacles hindering the flow of the fluid in the tube, a first oscillator fitted to the outer circumference of the measurement tube, a second oscillator fitted to the outer circumference of the measurement tube at a predetermined interval along the flow of the fluid from the first oscillator, and a plurality of acoustic filters fitted to the measurement tube between the first and second oscillators for cutting high frequency range of the oscillating wave propagating through the oscillating tube, in which the flow rate of the fluid is measured based on a time difference between a time required when the ultrasonic wave from the upstream oscillator reaches the downstream oscillator and another time required when the ultrasonic wave from the downstream oscillator reaches the upstream oscillator, wherein the acoustic filters are separated by an inner distance and comprise flanges having a thickness and the product of the inner distance of the acoustic filters and the thickness of the flanges is inversely proportional to said high frequency range of the oscillating wave.

* * * * *